Nov. 13, 1956  G. M. DYE ET AL  2,770,179
APPARATUS FOR PROCESSING STRIPS OF LIGHT-SENSITIVE MATERIAL
Filed March 18, 1950  7 Sheets-Sheet 4
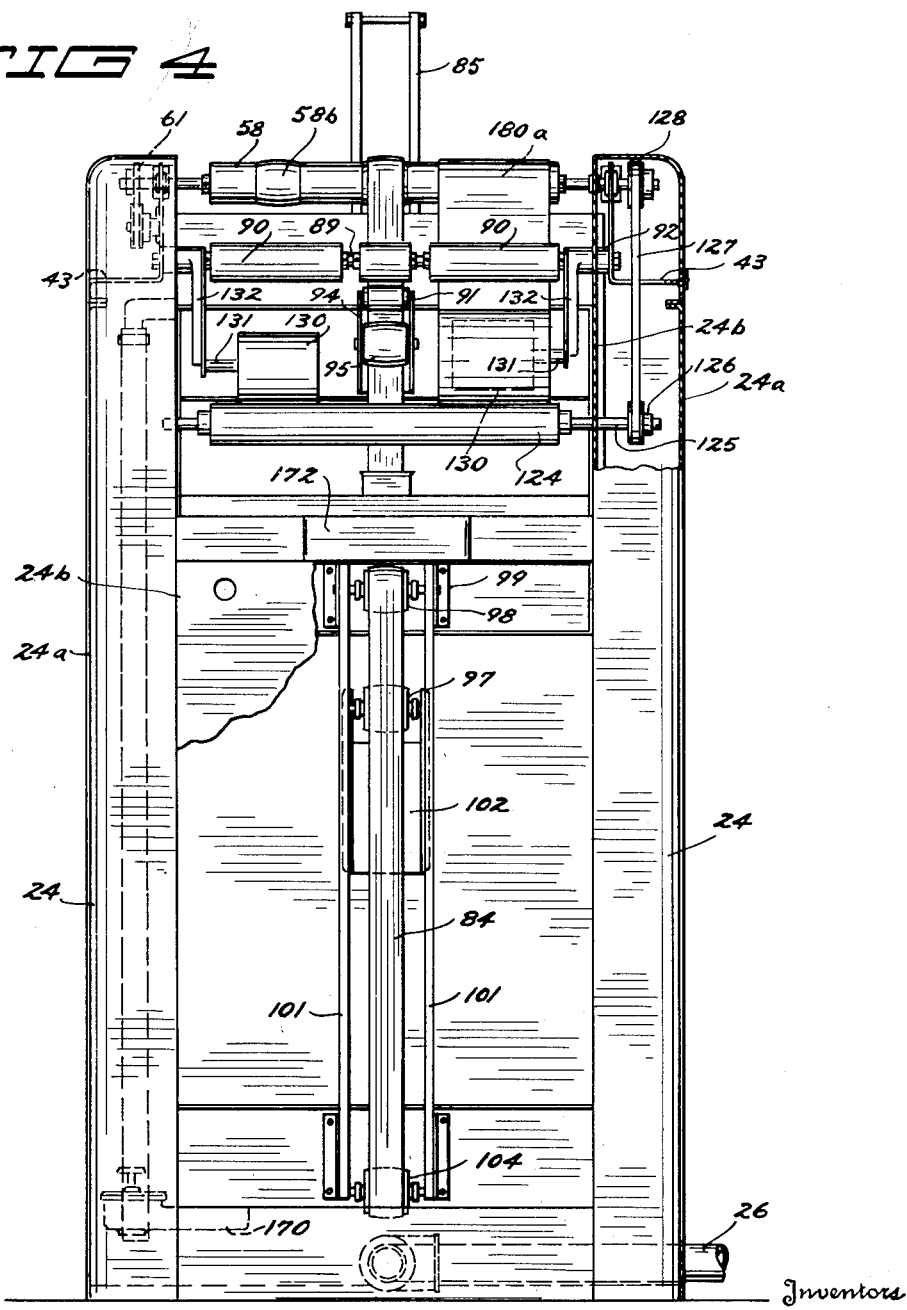
Inventors
GLEN M. DYE
JOHN F. BRADEN
CHRISTIAN O. KNUDSEN
Chas. C. Reif
ATTORNEY

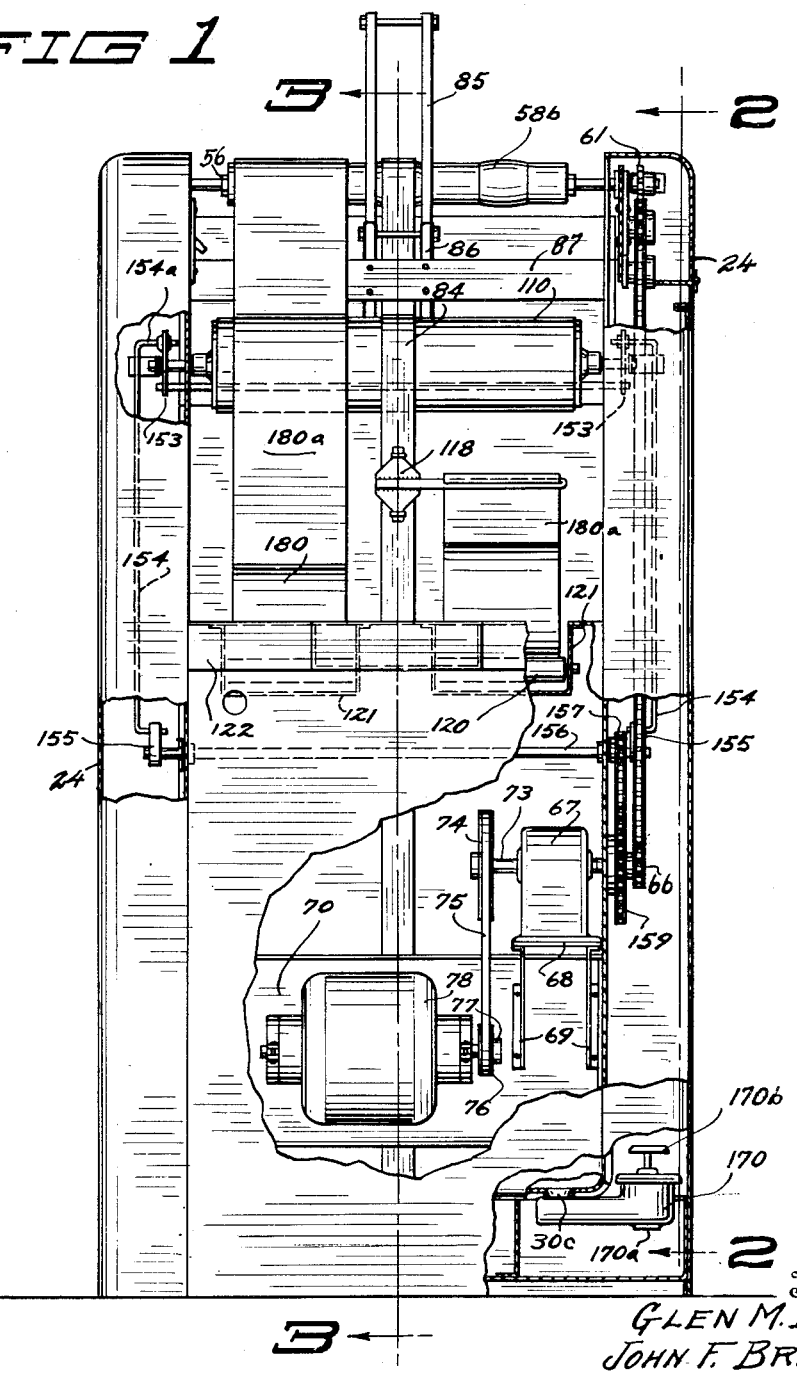

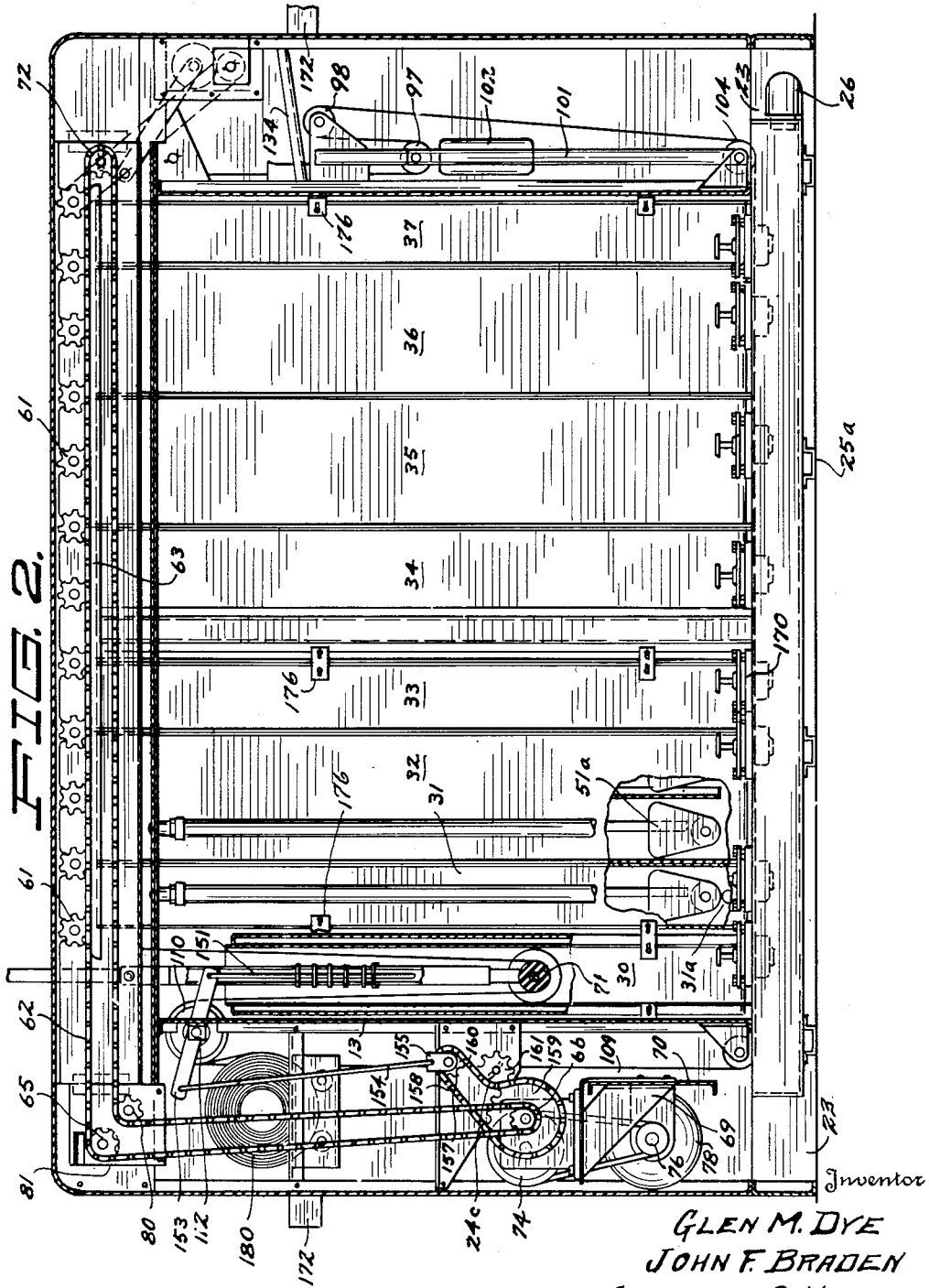

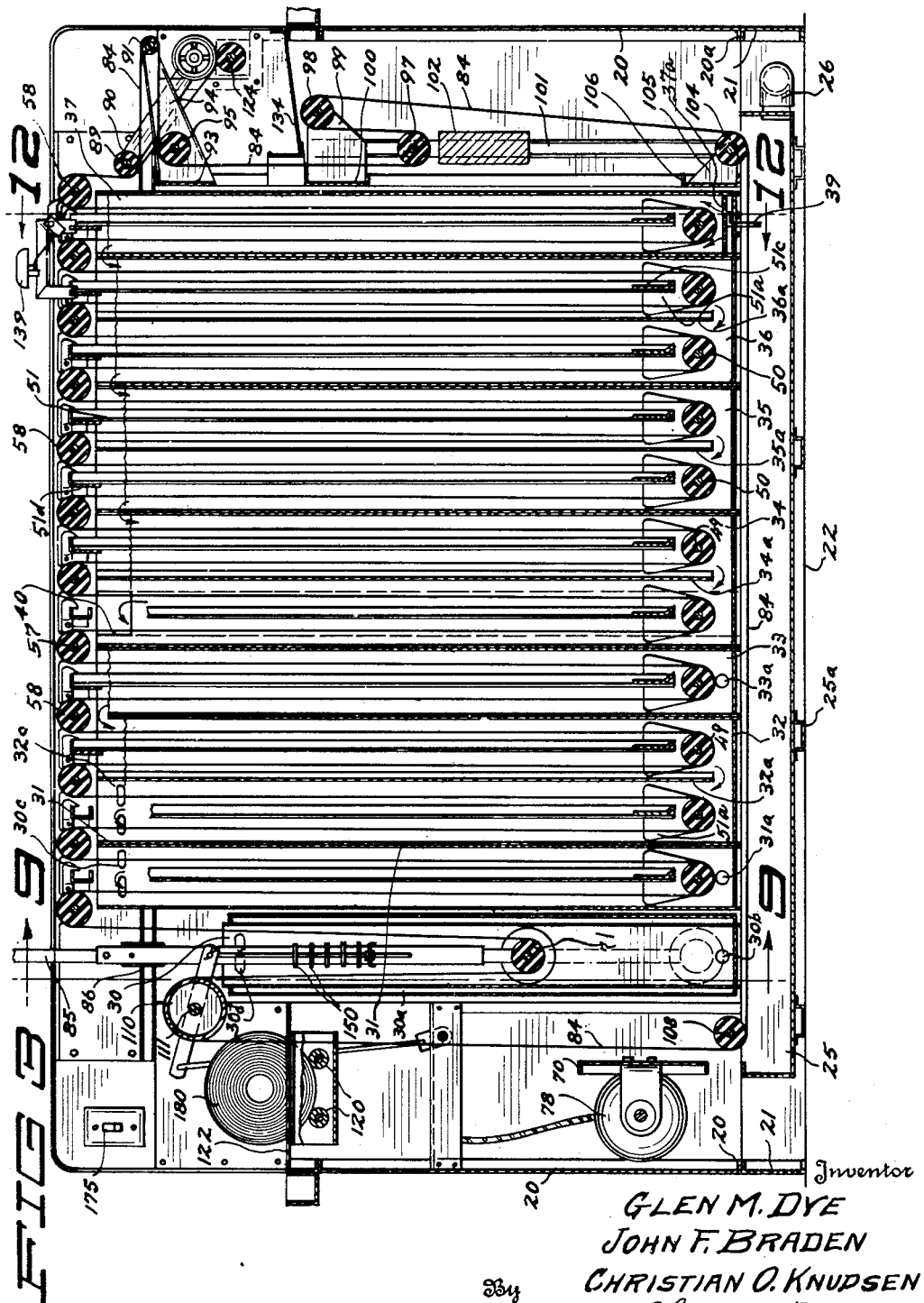

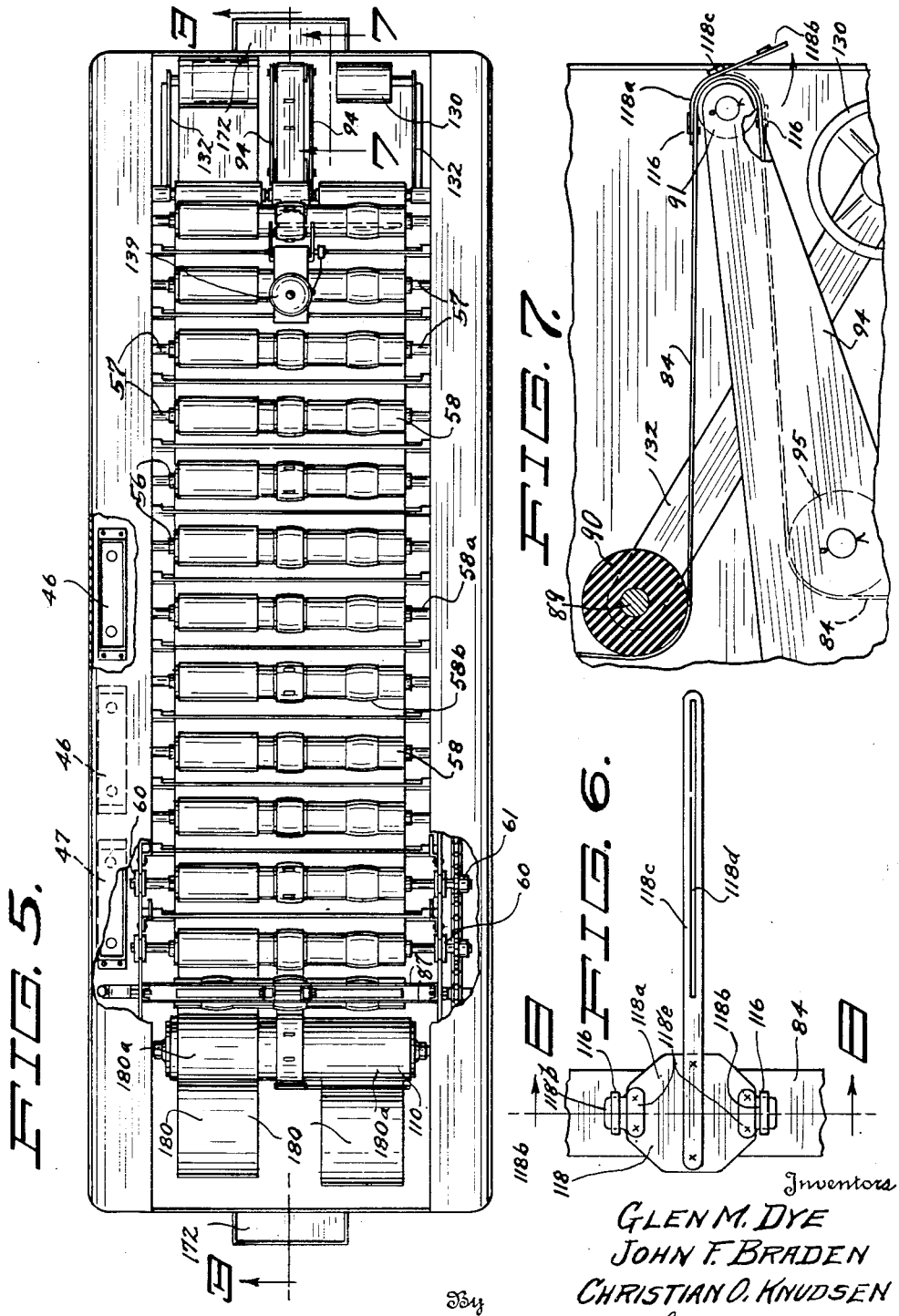

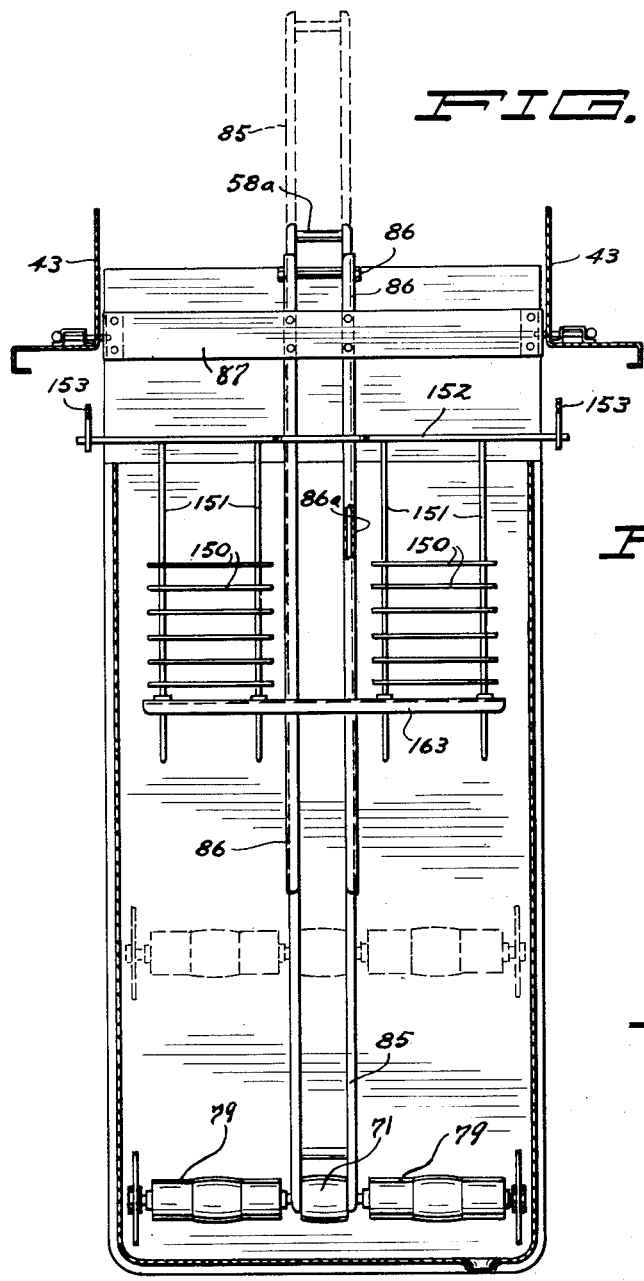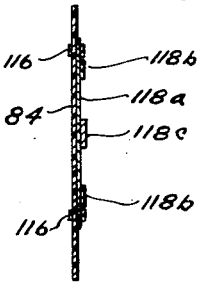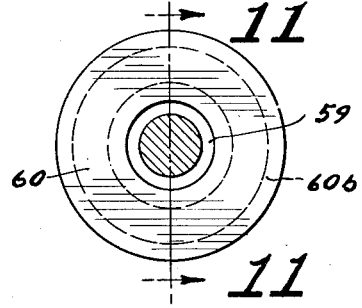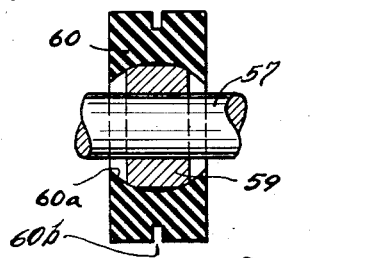

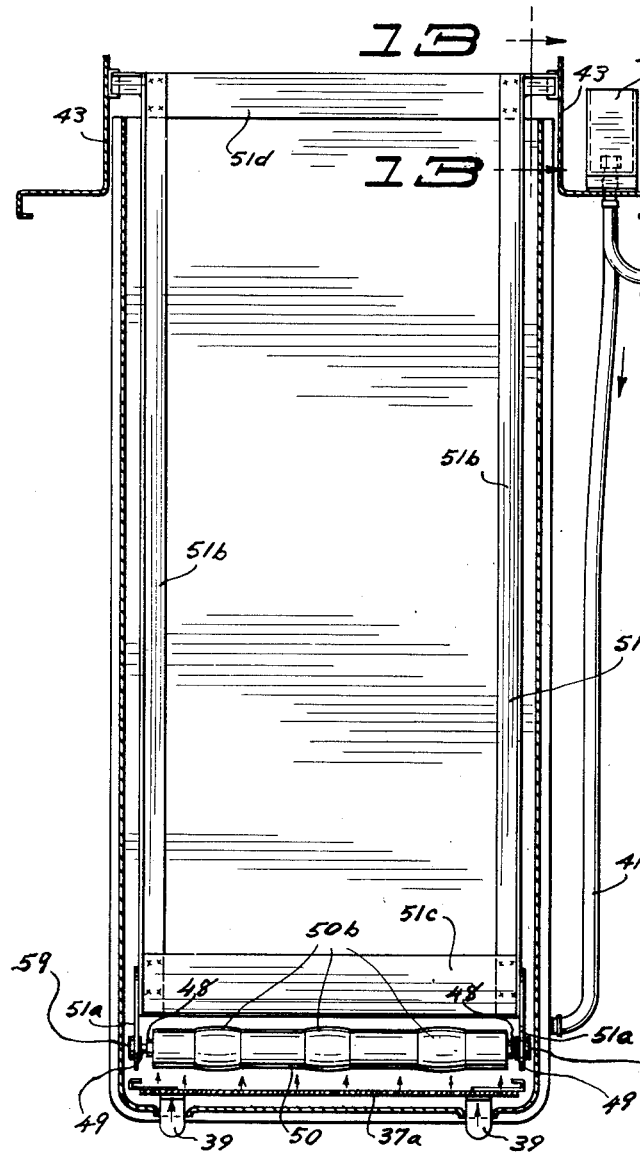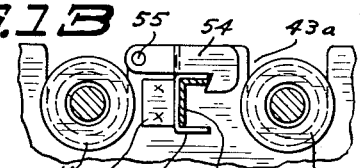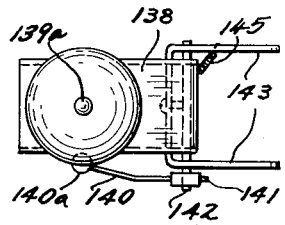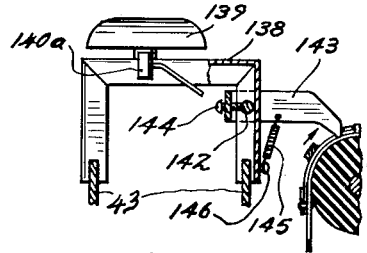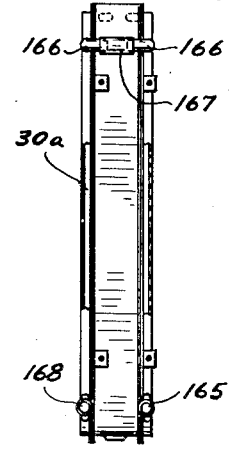

United States Patent Office 2,770,179
Patented Nov. 13, 1956

2,770,179

APPARATUS FOR PROCESSING STRIPS OF LIGHT-SENSITIVE MATERIAL

Glen M. Dye, Christian O. Knudsen, and John F. Braden, Minneapolis, Minn., assignors to The Pako Corporation, Minneapolis, Minn., a corporation of Delaware Application March 18, 1950, Serial No. 150,508

19 Claims. (Cl. 95—94)

This invention relates to a method and apparatus for processing one or more strips of photographic material, such as films or prints. It has long been desired to have a successful apparatus by means of which a strip of exposed photographic material could be moved through the various processing liquids, such as the developing liquid, the short-stop solution, the fixing liquid and the washing liquid and thus be progressively processed.

It is an object of this invention to provide an apparatus by means of which one or more strips of photographic material can be completely processed by being moved through the various processing liquids.

It is a further object of the invention to provide an apparatus for processing one or more strips of photographic material comprising a plurality of adjacent receptacles adapted respectively to contain the processing liquids, a lower roller in each of said receptacles extending across the same adjacent the bottom thereof, upper rollers above said receptacles and an endless leader belt running successively over said rollers so as to move downwardly and then upwardly in each of said receptacles and thus move through the group of said receptacles in a sinuous path, together with means secured to said belt and projecting outwardly therefrom at one or both sides thereof adapted to have the forward ends of strips secured thereto so as to lead said strips with and substantially parallel to said belt and through said path, whereby a plurality of strips can be simultaneously led through said liquids by said belt and thus processed.

It is another object of the invention to provide such an apparatus as set forth in the preceding paragraph in which said member or members attached to said belt for holding and leading the strips is detachably secured together with means for automatically detaching and discharging said member or members.

It is still another object of the invention to provide such an apparatus as set forth in the preceding paragraph save one, together with a rotatable member on which the strip or strips are wound after passing through said receptacles, together with a rotatable roller on which the wound rolls of said strips are supported for rotating said rolls and winding said strips.

It is more specifically an object of the invention to provide an apparatus for processing a plurality of strips of photographic material having in combination, a plurality of adjacent receptacles each having one or more vertically extending compartments therein of much greater height than length, a lower roller extending transversely in each compartment adjacent the bottom thereof, upper rollers extending transversely of said compartments above said receptacles and disposed vertically substantially midway between the centers of said compartments, said upper rollers having sprockets at one of their ends respectively, an endless driven chain running over said sprockets for driving said upper rollers, said rollers having trunnions preferably carried in oilless resiliently mounted bearings and said lower rollers being mounted in removable frames supported at their upper ends and a leader belt running over such rollers successively so as to traverse said plurality of receptacles in a sinuous path.

It is also another object of the invention to provide such an apparatus as set forth above, together with a signal adjacent the rear end of said group of receptacles constructed and arranged to be operated by the member which leads each strip and which is secured to said belt and also together with a tensioning means for said belt and an agitating means in the receptacle containing developing fluid which is vertically reciprocated between the downwardly extending and upwardly extending runs of said belt in said receptacle.

It is still further an object of this invention to provide an apparatus for processing one or more strips of photographic material by passing said strip through a plurality of adjacent receptacles adapted respectively to contain the processing liquids, said apparatus including a leader belt which moves successively through said receptacles and a strip-leading means or arm which can be so easily and quickly applied to the strip to be processed and to said leader belt that no appreciable time is lost when processing relatively short strips of paper or film.

It is also an object of this invention to provide an apparatus for processing one or more strips of photographic material comprising a plurality of adjacent receptacles adapted respectively to contain the processing liquids, a roller adjacent the bottom of each of said receptacles and upper rollers above said receptacles respectively, said strip running over said rollers, at least one of said upper rollers being positively driven and the remaining upper rollers being frictionally driven.

It is still further an object of this invention to provide such an apparatus as set forth in the preceding paragraph in which said upper rollers are carried on shafts having sprockets thereon, a positively driven chain engaging said sprockets for rotating said shafts, said one roller being secured to its shaft to be positively driven thereby and said other upper rollers being frictionally held on said shaft so that they can slip thereon.

It is another object of this invention to provide an apparatus for processing one or more strips of photographic material comprising a plurality of adjacent receptacles adapted respectively to contain the processing liquids, lower rollers in said receptacles respectively, upper rollers above said receptacles respectively, some of said rollers being driven, and a flexible leader belt traversing all of said rollers which contact the said strip when in wet condition, said leader belt constituting a motive power for rotating said rollers which are not otherwise driven whereby the burden of rotating said rollers is not put on said strip or strips and said strips are relieved of all stress and possible abrasion.

These and other objects and advantages of the invention will be fully set forth in the following description made in connection with the accompanying drawings in which like reference characters refer to similar parts throughout the several views and in which:

Fig. 1 is a view in front elevation of said apparatus, some parts being broken away and others shown in vertical section;

Fig. 2 is a view in side elevation of said apparatus, some parts being broken away and others shown in vertical section;

Fig. 3 is for the most part a vertical section taken substantially on line 3—3 of Fig. 5;

Fig. 4 is a view in rear elevation of said apparatus, some parts being broken away and others shown in vertical section;

Fig. 5 is a top plan view of said apparatus, some parts being broken away;

Fig. 6 is a plan view of a portion of the leader belt used and the strip-leading member which is referred to as a leader-arm;

Fig. 7 is a partial view showing the discharge portion of the belt on an enlarged scale;

Fig. 8 is a vertical section taken on line 8—8 of Fig. 6, as indicated by the arrows;

Fig. 9 is a vertical section taken on line 9—9 of Fig. 3, as indicated by the arrows;

Fig. 10 is a view in side elevation of the structure shown in Fig. 11;

Fig. 11 is a vertical section taken on line 11—11 of Fig. 10, as indicated by the arrows;

Fig. 12 is a vertical section taken on line 12—12 of Fig. 3;

Fig. 13 is a vertical section taken on line 13—13 of Fig. 12, as indicated by the arrows;

Fig. 4 is a plan view of a signal used;

Fig. 15 is a view partly in side elevation and partly in vertical section of said signal also showing a roller, the leader belt and the leader-arm; and Fig. 16 is an end view of a roller-carrying frame used.

Referring to the drawings, a machine or apparatus is shown having end walls 20 disposed in substantially vertical planes, the same having lower flanges 20a resting upon the tops of channel members 21 having their webs vertically aligned with walls 20 and resting upon a floor or supporting surface 22. At each side the machine has housings 24 having outer vertical walls 24a and inner vertical walls 24b. A trough 25 is disposed between channel members 21 having channel-shaped supporting strips or legs 25a engaging floor 22 so that the bottom of said trough is spaced from said floor. A drain pipe 26 is connected to one end of trough 25 and extends at one side of the machine to a suitable drain. A plurality of receptacles 30, 31, 32, 33, 34, 35, 36 and 37 are provided the same having adjacent sides which in the embodiment of the invention illustrated is shown as having their sides in contact. These receptacles having flanges at their bottoms are supported above trough 25 on longitudinally extending base members 23. Receptacle 30 will usually contain developing fluid, receptacle 31 will contain a short-stop solution of fluid, receptacles 32 and 33 will contain fixing liquid, and receptacles 34, 35, 36 and 37 will contain washing liquid. Receptacle 30 is provided at its sides with chambers 30a through which a temperature controlling fluid will be circulated. Receptacles 32, 34, 35 and 36 are provided with central partitions 32a, 34a, 35a and 36a which divide said receptacles into two vertically extending compartments. The various compartments in said receptacles are thus shown as having vertical parallel walls and said compartments are of much greater height than length. Washing liquid, such as water, is supplied to the bottom of receptacle 37 through suitable conduits 39, which liquid is distributed by a perforated plate 37a adjacent the bottom of said receptacle. Said liquid will rise to adjacent the top of receptacle 37 and will pass out through suitable openings into receptacle 36. The liquid will flow in turn through a discharge opening into receptacle 35 and similarly from receptacle 35 into receptacle 34 from which it will pass out laterally through a transversely extending trough 40. The discharge or overflow openings are successively farther from the tops of said receptacles so that the level of liquid maintained in receptacles 37, 36, 35 and 34 is progressively lower. The fixing solution or hypo solution will be supplied to receptacle 33 through an opening 33a by a conduit 41 which leads from a receptacle 42 supported upon one of a pair of brackets or members 43 which extend along the sides of said receptacles and are secured to the outer wall of housings 24 respectively, as shown in Fig. 1. A supply conduit 44 is also shown for receptacle 42. Short-stop solution and developing liquid will also be supplied to receptacles 30 and 31 through the openings 30b and 31a at the bottoms of said receptacles by conduits similar to conduit 41 which will extend from supply receptacles 46 and 47. (See Fig. 5.)

The cooling solution for chambers 30a is supplied to one of the same through a conduit 165 at the bottom thereof. The said cooling fluid rises to adjacent the top of one chamber and then passes through the pipes 166 and a connecting coupling 167 to the top of the chamber 30a and downward to an outlet conduit 168.

Disposed adjacent the bottom of each of said compartments except that containing the developing fluid and extending transversely of the same is a lower roller 50. Rollers 50, as shown in Fig. 12, extend across each of said compartments and are carried on shafts 49 journaled in bearings 59, carried in resilient members 60 disposed in plates 51a secured to the sides of frames 51 which have angle members 51b at each side which in turn are connected by transverse plates 51c adjacent their bottoms. Frames 51 have angle plates 51d at their upper ends extending between angle members 51b and these are supported in channels 52 having plates 52a secured thereto and welded to the inner sides of members 43. (See Figs. 12 and 13.) Hooks 54 are secured by pivots 55 to members 43 and the bills of said hooks extend respectively over the upper sides of members 51d to hold or lock frames 51 in position. Shafts 49 are shown as provided with collars 48 holding rollers 50 in position. It will be noted that rollers 50 have three spaced crowned portions 50b thereon. Frames 51 can be lifted and removed from the compartments in which they are disposed by releasing the hooks 54.

Upper rollers 58 are provided which extend transversely of the said receptacles and compartments, the same being disposed above said receptacles, and the axes thereof are substantially in vertical alignment with the sides of the compartments. These axes are thus substantially midway between the longitudinal centers of the compartments and all of them except the end rollers substantially midway between the axes of the lower rollers 50. Rollers 58 are made of resilient material, such as rubber, and are frictionally carried on shafts 57. Each comprises two side and one center section, said sections being held in position on shafts 57 by collars 56 in turn held in place by any suitable means, such as set screws. Said shafts 57 are journaled in bearing members 59 of general cylindrical shape, as shown in Figs. 10 and 11. Shafts 49, as previously stated, are journaled in similar bearings. Members 59 will be made of graphite or similar material and they are disposed and held in semi-spherical chambers 60a in resilient members 60 of general cylindrical form and which will be made of rubber or other suitable yielding or resilient material. Members 60 have annular grooves 60b disposed centrally of and extending about their peripheries and members 60 are carried in the upper ends of members 43 which are provided with slots or recesses 43a, the sides of said slots being disposed in the grooves 60b. The bearings 60 can thus be lifted and removed with rollers 58. The bearing 59 is an oilless bearing. The same can be used in or out of the processing liquids. Each roller 58 has secured adjacent the end of one of its trunnions a sprocket 61, and an endless driven chain 62 engages the bottom of all of the said sprockets, said chain being supported at the bottom of said sprockets by a guide plate 63 supported from one of the members 43. The chain 62 passes over a sprocket 65 suitably journaled in one of the housings 24 and said chain then passes downwardly over a sprocket 66 secured to the low speed shaft of a speed reducing device 67 supported upon a plate 68 in turn supported by spaced brackets 69 having flanges secured to a plate 70 which extends between the inner walls of housings 24. Chain 62 also extends over a longitudinally adjustable sprocket 72 adjacent the rear end of one member 43. The speed reduction device 67 has a high speed shaft 73 to which is secured a pulley 74 over which runs a belt 75 also running over a pulley 76 secured to the driving shaft 77 of an electric motor 78 secured to plate 70. Chain 62 also runs over a sprocket 80 adjacent sprocket 65, both sprockets 65 and 80 being journaled on shafts carried in a plate 81 secured in one of the housings 24. Chain 62 is thus driven by sprocket 66 and passes successively over sprockets 65, 72 and 80, and as stated, meshes with sprockets 61. The rollers 58, like rollers 50, are provided with three spaced crowned portions 58b. An endless comparatively narrow belt 84, which will be called a leader or leader belt, runs over the top of each of the rollers 58 and around the bottom of each of the rollers 50. There is also a shaft 64 extending transversely of receptacle 30 and journaled in bearings in spaced vertically extending members or bars 85 near the middle of receptacle 30. Members 85 are movable in guides 86 secured to spaced transversely extending bars 87 attached at their ends to members 43. Shaft 64 has secured thereto a central crowned roller 71 and similar rollers 79 at each side thereof having crowned central portions. A headed and nutted bolt 88 passes through bars 85 and the guide member 86 which can also be placed through other holes 86a when said rollers 71 and 79 are positioned in their lower position, as shown in full lines in Fig. 9. Bars 85 are connected adjacent their upper ends by the cylindrical member 85a which forms a convenient handle for moving said bars. Shaft 64 has secured to each end thereof disks 83 which move between the sides of receptacle 30 in the movement of bars 85 and keep said bars in a rectilinear path. After passing over the rearmost upper roller 58, belt 84 passes under a roller 90 carried on a shaft 89 supported in bearings 92 secured to plates 43. Belt 84 then runs in a substantially horizontal plane and around the rear side of a small pulley 91 carried on a shaft in plates 94 carried by a transversely extending plate 93. Belt 84 then passes forwardly in a substantially horizontal plane and over a pulley 95 carried on a shaft also supported in spaced plates 94. It will be seen that belt 84 makes a very sharp turn about the rear side of pulley 91. From pulley 95 belt 84 passes substantially vertically downward and around a pulley 97 and then upward and over the top of a pulley 98 carried on a shaft supported in spaced plates 99 projecting rearwardly from a transversely extending plate 100. The pulley 97 is carried on a shaft journaled in bearings vertically movable in spaced guide members 101. A weight 102 is secured to said bearings and thus pulls downwardly upon pulley 97. Weight 102 therefore acts as a tensioning means for belt 84. After passing over pulley 98 belt 84 extends downwardly and passes around a pulley 104 carried on a shaft in spaced plates 105 projecting rearwardly from and secured to a transversely extending plate 106. From pulley 104 belt 84 passes forwardly and substantially horizontally beneath receptacles 30 to 37 and around a pulley 108 carried on a shaft journaled in spaced vertically extending plates 109. From pulley 108 belt 84 passes upwardly and substantially vertically over a pulley 110 carried on a shaft 111 journaled in bearings 112 secured to a vertically extending plate 113. From pulley 110 belt 84 passes downwardly in receptacle 30 and around the foremost lower roller 71. The belt 84 is driven by the rollers 58 which as previously described are rotated by the chain 62. The foremost upper roller 58 is made of slightly smaller diameter than the other upper rollers 58 and is fixed to its shaft so as to be positively driven. By making this roller somewhat smaller than the others driving it positively, a uniform tension is secured on the other rollers 58.

The belt 84 has secured thereto at intervals, spaced attaching means 116 illustrated as in the form of staples. Print holding and leading members called leader-arms are provided to which the strips to be processed are attached and by means of which the starting end of each strip is conducted or led through the receptacles. While these leader-arms could be variously made, in the embodiment of the invention illustrated such a leader-arm 118 comprises a thin flexible plate which in practice has been made of metal and which has a central portion 118a with tongues 118b projecting from each end thereof. Spaced reinforcing pads 118c are spotwelded to portion 118a. The tongues 118b are adapted to be placed in the attaching means or staples 116, as illustrated in Fig. 6. Plate 118a is merely flexed and the tongues quickly inserted in members 116. Member 118 also has disposed centrally thereof and projecting laterally therefrom at one side substantially at right angles to the center of belt 84 a strip-holding bar or member 118c. In practice this bar has been spotwelded to plate 118a. Bar 118c is comparatively narrow and is provided with an elongated slot 118d which passes therethrough.

A pair of spaced rollers 120 are provided at each side of belt 84, as shown in Figs. 1 and 3, said rollers having their axes in the same horizontal plane and having trunnions supported in the sides of trough-shaped plates 121 secured to transversely extending members 122.

At the rear of the machine a roller 124 is provided carried on a shaft 125 suitably journaled in the sides of housings 24 and having secured to one end thereof a pulley 126 over which runs a belt 127 also running over a pulley 128 secured to the extended shaft or trunnion of the rearmost roller 58. Disposed with their axes substantially vertically above roller 124 are rollers 130 disposed respectively at opposite sides of belt 84 and rotatable on shafts 131 carried on arms 132 which are journaled on shaft 89. A plate 134 is supported from end plate 20 and extends downwardly and forwardly to the top of plate 100.

A signal device is provided, the same comprising a bracket 138. (See Figs. 3, 5, 14 and 15.) Bracket 138 has a horizontal top portion and depending angle portions which are provided with slots at their bottoms which fit respectively over the two rearmost plates 51d. A bell or gong 139 is supported on the top of bracket 138 by a central pin or projection 139a. A tapper arm 140 is provided having at one end a head 140a adapted to strike the bell or gong 139. Arm 140 has a hub secured in any suitable manner, as by a set screw 141, to a shaft 142 extending through the sides of bracket 138 and through the side arms of a yoke 143. A set screw 144 extends through the front side of yoke 143 centrally thereof and engages shaft 142. A tensile coiled spring 145 is attached to one arm of yoke 143 and at its other end attached to a screw 146 secured in one side of bracket 138. Yoke 143 has rearwardly extending arms which extend downwardly at their rear ends and are somewhat pointed. It will be seen that yoke 143 will swing with shaft 142 and thus with arm 140. The lower ends of arms of yoke 143, as shown in Fig. 3, are disposed in the path of any strip-holding bar 118c which may be attached to leader belt 84.

An agitating means is provided for the developing fluid in receptacle 30. While this could take various forms, in the embodiment of the invention illustrated, a plurality of plates 150 are provided disposed substantially horizontally and through which extend vertical spaced rods 151 secured at their upper ends to a transversely extending rod 152. Rod 152 extends through openings in arms 153 journaled on the trunnions of roller 149 and the other ends of which are connected to the horizontally extending ends 154a of vertically extending links 154 which have horizontally extending portions at their lower ends disposed in arms 155 secured to a shaft 156 journaled in bearings carried in the inner sides of housings 24. Shaft 156 has secured thereto a sprocket 157 over which runs a chain 158 also running over a sprocket 159 secured to shaft 73 of the speed reduction unit 67. Chain 158 also runs over a small sprocket 160 secured on a stud 161 carried in the inner side of one of the housings 24 and being adjustable in a slot 24c therein. Sprocket 160 can thus be adjusted to give the proper tension on chain 158. The lower ends of rods 151 are secured in a transversely extending bar 163.

Valves 170 are provided for each of the receptacles 30 to 37, said valves being adapted to receive liquid from said receptacles through outlets 30c and to discharge said liquid through the outlets 170a. Said valves are provided with handles 170b for opening and closing the same.

The end plates 20 are provided with troughs or receptacles 172 at front and rear for containing extra leader-arms 118 when not in use. A switch 175 for motor 78 is shown at the upper left-hand part of Fig. 3. Small brackets 176 are provided for adjustably securing the various receptacles to each other.

In operation, motor 78 will be operated which will operate the speed reduction unit 67 so that chain 62 will be driven. The leader belt 84 will thus be driven by the upper rollers 58 and will move over the various pulleys and rollers described. The proper solutions will be supplied to receptacles 30 to 37. Ordinarily developing fluid will be placed in receptacle 30, a short-stop solution will be placed in receptacle 31, and hypo or fixing solution will be placed in receptacles 32 and 33. Washing liquid, such as water, will be placed in receptacles 34 to 37. The developing liquid, the short-stop solution and the fixing solution will be automatically supplied through the conduits 41 by a special supply means in the receptacles 46. The water, as described, will be supplied through conduits 39 and will rise in tank 37 to the height indicated in Fig. 3. By the overflow openings indicated in Fig. 3, the levels of the washing fluid will be maintained as indicated in said figure and the washing fluid will flow out through the trough 40. The fixing solution will flow from the top of receptacle 33, as indicated, into receptacle 32 and will pass therefrom through the overflow opening 32c. The developer supplied to tank 30 will pass out through the overflow opening 30d. When a strip is to be processed the same will be brought to the machine in a roll 180, as shown in Fig. 3. This will be placed on a pair of the rollers 120. The operator will take the end of the strip and pass it through the slot 118d in the leader-arm 118 and fold the end backward thus securing it. As belt 84 is moving, the operator will insert the tongues 118b of the leader-arm into a pair of attaching means 116, as shown in Fig. 6. This can be very quickly done. The said strip will now be led along by the member 118 at the side of belt 84, as shown in Fig. 1. At the left-hand side of Fig. 1 a strip is already moving over the rollers 58 and at the right-hand side a leader-arm 118 is shown to which the strip 180a has just been attached. As the roll 180 of the strip is unwound, said roll rotates on rollers 120. The leader-arms 118 can be attached to extend at either side of belt 84. As belt 84 now moves over the rollers 58 and down under the rollers 79 and 50, the two strips will be simultaneously led along therewith and will move through the receptacles and around said rollers at the sides of belt 84 and in substantially the same planes as belt 84. The speed of belt 84 is determined by the first driven roller 58. All of the rollers 58, except the foremost one, can slip on shafts 49. They are frictionally driven according to the pressure of collars 56. The foremost roller 58 which is of slightly smaller diameter than the others is as stated positively driven. When the leader-arm 118 passes around the rearmost upper roller 58 on belt 84, the bar 118c will engage the arms of yoke 143, as indicated in Fig. 15, and said arms will be lifted, thus swinging shaft 142 and swinging the tapper 140a away from bell or gong 139. As bar 118c passes yoke 143 the same will be drawn down again as said bar passes and the tapper 140a will strike the bell or gong 139, thus telling the operator that the end of a strip is approaching the rear end of the machine. When the leader-arm 118 passes with belt 84 around pulley 91, the sharp turn made by belt 84 causes the leader-arm 118 to become detached from the belt and it will drop on the shelf 134. The operator now starts the forward end of the strip around one of the rollers 130 and said roller is rotated by the roller 124 therebeneath. Said roller 124 will continue to engage the roll of the strip as it is wound on roller 130 and to rotate the same. The roller 124 thus acts to wind the strip onto the roller 130 and the roll of the strip is rotated properly to keep the strip winding with the proper tension. As the roll of the strip becomes larger it will have greater weight and will press on the roller 124 with more force so that there will be more friction to rotate the roll. The strip is thus wound with substantially uniform linear speed. It will thus be seen that the single leader belt 84 serves the two processing lines of the two strips which are simultaneously processed.

As the chain 158 is constantly driven, the arms 153 will be oscillated and the rods 151 will be vertically reciprocated, thus reciprocating the plates 150. This will properly agitate the developing liquid to keep a uniform agitation thereof on the face of the strips as development progresses within receptacle 30. As above described, rollers 71 and 79 in receptacle 30 can be disposed in different heights for effecting different degrees of development.

The receptacles can be conveniently emptied when desired by means of the valves 170. The upper rollers 58 can be lifted with their bearings 60 from the members 43 and removed. The frames 51 can then be released by moving the hooks 54 and said frames with the lower rollers 50 can then be lifted from the receptacles. The receptacles can then conveniently be cleaned.

From the above description it will be seen that we have provided a very simple and very efficient apparatus for simultaneously processing a plurality of strips of light-sensitive or photographic material. As above described the strips are started through the receptacles containing the various processing liquids by means attached to an endless leader belt. This belt, as stated, is driven by the upper rollers. The belt is nicely tensioned and the desired speed is had by the drive from said upper rollers. Also, as stated, foremost roller 58 over which the strip runs is made a trifle smaller in diameter than the subsequent rollers over which the leader belt runs. By this structure and the positive driving of the foremost roller the tension on the leader belt is nicely distributed and said tension by the various rollers is made substantially uniform. An important feature of the apparatus is that the lower rollers 79 and 50 are rotated by belt 84 so that the strips 180a are relieved of any strain. The strips of material are nicely wound in rolls after passing through the various receptacles. The crowned portions on the various rollers, as shown and described, acts to hold the leader belt and the strips properly positioned laterally of the rollers.

The apparatus has been amply demonstrated in actual practice, found to be very successful and efficient and is being commercially used.

It will of course be understood that various changes may be made in the form, details, arrangement and proportions of the parts, without departing from the scope of applicants' invention, which generally stated, consists in a device capable of carrying out the objects above set forth, in the parts and combinations of parts disclosed and defined in the appended claims.

What is claimed is:

1. An apparatus for processing a pair of strips of light-sensitive material having in combination, a plurality of receptacles adapted to contain liquids, a lower roller in each of said receptacles respectively, upper rollers above said receptacles, an endless leader belt running over said rollers in sequence whereby it moves downwardly and upwardly in each receptacle and traverses all of said receptacles in a sinuous path, said belt having spaced attaching means thereon, a pair of members detachably secured adjacent one of their ends respectively in said means and each having a portion projecting at one side of said belt and having a free end, said members being adapted to engage the forward ends of said pair of strips respectively and lead the same over said upper and lower rollers successively at each side of said belt and thus lead said strips through all of said receptacles in said sinuous path.

2. The structure set forth in claim 1, and a small roller at one end of said receptacles over which said belt moves with a sharp turn for detaching and discharging said members.

3. The structure set forth in claim 1, and means for rotating all of said upper rollers for moving said belt.

4. The structure set forth in claim 1, the upper roller over which said belt first moves being of smaller diameter than the other upper rollers.

5. The structure set forth in claim 1, a rotatable roller at the rear end of said receptacles on which one of said strips is wound in a roll, and a driven rotatable roller beneath said roller on which said roll of said strip rests for rotating said roll of said strip and winding the strip thereon at substantially the same linear speed at which said strip moves through said receptacles.

6. The structure set forth in claim 1, the first one of said receptacles containing developing liquid, an agitating means in said receptacle comprising vertically spaced substantially horizontal plates disposed between the downwardly moving and upwardly moving parts of said belt in said receptacle, and means for vertically reciprocating said agitating means to agitate said liquid so that a strip moved through said receptacle by said belt will be properly acted upon.

7. The structure set forth in claim 1, a roller adjacent the discharge end of said belt on which one of said strips is wound on a roll, a second roller beneath said last mentioned roller on which said roll rests, said first mentioned roller being freely movable upwardly, and means for rotating said first mentioned roller to rotate said roll and move said strip at substantially the same linear speed at which said strip moves through said receptacles.

8. An apparatus for processing strips of light-sensitive material having in combination, a frame having transversely spaced side members a plurality of receptacles for containing treating liquids disposed between said side members, a lower roller in each receptacle extending transversely thereof adjacent the bottom of said receptacle, upper rollers above said receptacles respectively, an endless leader belt disposed substantially midway between said side members and running successively over said upper and lower rollers so as to traverse all of said receptacles in a sinuous path, members secured to said belt and projecting at each side thereof adapted to propel films attached thereto at each side of said belt through said path, sprockets on the ends of said upper rollers and a driven endless chain running over said sprockets for rotating said upper rollers and moving said belt by its frictional engagement with said upper rollers.

9. The structure set forth in claim 1, means for positively driving one of said upper rollers, and means for frictionally driving the other upper rollers for moving said belt.

10. The structure set forth in claim 1, and means for positively driving at least one of said upper rollers to move said belt.

11. The structure set forth in claim 1, and means for frictionally driving some of said upper rollers for moving said belt.

12. The structure set forth in claim 1, certain of said upper rollers each comprising a center section and sections at each side thereof, a shaft on which said sections are carried and means holding said sections frictionally on said shaft.

13. The structure set forth in claim 1, and means for winding one of said processed strips in a roll having substantially uniform peripheral speed as it is wound.

14. The structure set forth in claim 1, said leader member having means for quick application of the end of said strip thereto for leading said strip and having means for quick attachment to said belt whereby substantially no time is lost when processing a number of short strips.

15. The structure set forth in claim 1, a signal adjacent one of said receptacles having an actuating arm disposed adjacent said belt and adapted to be engaged and swung by one of said members as said member moves with said belt for operating said signal.

16. An apparatus for processing a pair of strips of light-sensitive material having in combination, a frame having transversely spaced side members, a plurality of receptacles adapted to contain various processing liquids disposed between said side members, a lower roller in each of said receptacles, upper rollers above said receptacles respectively, an endless leader belt running over said rollers in sequence whereby it moves downwardly and upwardly in each receptacle and traverses all of said receptacles in a sinuous path, a pair of leaders carried by said belt and projecting at opposite sides thereof respectively and having free ends respectively at said sides, said members being adapted to engage the forward ends respectively of said strips and lead the same over said upper and lower rollers successively at each side of said belt and thus through all of said receptacles in said sinuous path, said belt having spaced members thereon with openings therein spaced longitudinally of said belt and each of said leaders having an elongated portion for holding its associated strip and having a second portion with spaced tongues thereon adapted to be inserted in said openings respectively with said first mentioned portion projecting laterally from said belt.

17. The structure set forth in claim 16, said first mentioned members being in the form of staples and said openings being between said staples and said belt.

18. The structure set forth in claim 16, said second mentioned portion being flexible so that the same can be flexed to place said tongues in said openings.

19. An apparatus for processing a pair of strips of light sensitive material having in combination, a plurality of receptacles adapted to contain liquids, a lower roller in each of said receptacles, upper rollers adjacent the tops of said receptacles respectively, an endless leader belt running over said rollers in sequence whereby it moves downwardly and upwardly in each receptacle and traverses all of said receptacles in a sinuous path, said belt having spaced attaching means thereon, a pair of members detachably secured to said means and having portions projecting at the sides of said belt respectively, said members being adapted to engage the forward ends of said pair of strips and lead the same over said upper and lower rollers successively at each side of said belt and thus lead said strips through all of said receptacles in said sinuous path, and means for automatically detaching said members from said belt.

References Cited in the file of this patent

UNITED STATES PATENTS

| 2,461,419 | Forgett | Feb. 8, 1949 |
| 2,541,353 | Goetz et al. | Feb. 13, 1951 |

FOREIGN PATENTS

| 9,842 | Great Britain | of 1902 |
| 18,852 | Great Britain | of 1913 |
| 357,597 | Great Britain | Sept. 28, 1931 |
| 847,737 | France | July 3, 1939 |